United States Patent [19]
Nguyen

[11] Patent Number: 6,102,664
[45] Date of Patent: Aug. 15, 2000

[54] BLADING SYSTEM AND METHOD FOR CONTROLLING STRUCTURAL VIBRATIONS

[75] Inventor: Nhan Nguyen, Santa Clara, Calif.

[73] Assignee: The United States of America as represented by the Administrator of the National Aeronautics and Space Administration, Washington, D.C.

[21] Appl. No.: 08/572,395

[22] Filed: Dec. 14, 1995

[51] Int. Cl.[7] .................................................. F04D 29/34
[52] U.S. Cl. ........................................ 416/248; 416/500
[58] Field of Search ........................... 416/204 A, 219 R, 416/220 R, 221, 224, 241 R, 248, 500

[56] References Cited

U.S. PATENT DOCUMENTS

| | | | |
|---|---|---|---|
| 2,936,155 | 5/1960 | Howell et al. | 416/500 |
| 3,317,988 | 5/1967 | Endres | 416/219 R |
| 3,601,228 | 8/1971 | Nashif | 188/1 |
| 3,784,320 | 1/1974 | Rossmann et al. | 416/219 R |
| 3,842,945 | 10/1974 | Potter | 188/1 |
| 3,867,066 | 2/1975 | Canova et al. | 416/500 |
| 3,910,719 | 10/1975 | Hessler et al. | 416/219 R |
| 4,192,633 | 3/1980 | Herzner | 416/221 |
| 4,329,119 | 5/1982 | Baskin | 416/226 |
| 4,471,008 | 9/1984 | Huther | 416/219 R |
| 4,593,526 | 6/1986 | Pankowiecki | 60/657 |
| 4,820,126 | 4/1989 | Gavilan | 416/221 |
| 5,123,813 | 6/1992 | Przytulski et al. | 416/219 R |
| 5,160,243 | 11/1992 | Herzner et al. | 416/248 |
| 5,240,375 | 8/1993 | Wayte | 416/220 R |
| 5,356,545 | 10/1994 | Wayte | 416/219 R |

FOREIGN PATENT DOCUMENTS

| | | | |
|---|---|---|---|
| 0134184 | 9/1949 | Australia | 416/204 R |
| 488971 | 12/1952 | Canada | 416/500 |
| 1281033 | 11/1961 | France | 416/220 |
| 4588516 | 2/1959 | Italy | 416/219 R |
| 0244804 | 10/1986 | Japan | 416/219 R |
| 50402 | 2/1992 | Japan | 416/248 |
| 0655466 | 7/1951 | United Kingdom | 416/219 R |
| 1457417 | 12/1976 | United Kingdom | 416/500 |
| 2026101 | 1/1980 | United Kingdom | 416/221 |

OTHER PUBLICATIONS

M.P. Hanson, "A Vibration Damper for Axial–Flow Compressor Blading", S.E.S.A. Proceedings, vol. XIV No. 1, pp. 155–162.

A.V. Srinivasen et al., "Turbojet Engine Blading Damping", NASA Contract Report 165406, Jul. 1981.

*Primary Examiner*—John Kwon
*Attorney, Agent, or Firm*—Robert M. Padilla; Gary G. Borda; John G. Mannix

[57] ABSTRACT

A new blading system for controlling the structural vibrations in axial-flow compressors, turbines, or fans, as in aircraft engines and like turbomachines including a stator disc and a rotor disc is presented. The rotor disc defines several radial hubs that retain the rotor blading systems. Each blading system includes a blade formed of an airfoil, and a root attachment which is dimensioned to fit within, and to engage a corresponding hub. Viscoelastic dampers are selectively applied to the outer surfaces of the root attachment on which compressive or shear forces are likely to develop, intermediate the root attachment and the hub, for compression therebetween upon rotation of the rotor disc, in order to dampen structural vibrations. One advantage presented by the viscoelastic dampers lies in its simplicity, efficiency, cost effectiveness, and its ability to be retrofitted into existing turbomachines with minor surface treatment of the root attachments. Furthermore, since the dampers are not exposed to the inflowing airstream, they do not affect the aerodynamic performance of the turbomachine. Another feature of the damping system is that it provides a significant source of damping to minimize destructive structural vibrations, thereby increasing the durability of the turbomachine, and reducing acoustic noise accompanying high amplitude vibrations.

21 Claims, 16 Drawing Sheets

PRIOR ART   FIGURE 7

BLADING SYSTEM AND METHOD FOR CONTROLLING STRUCTURAL VIBRATIONS

ORIGIN OF INVENTION

The invention described herein was made by an employee of the United States Government and may be manufactured and used by or for the Government for governmental purposes without payment of any royalties thereon or therefor.

BACKGROUND OF THE INVENTION

1. Technical Field of the Invention

The present invention is generally directed to structural vibrations, and particularly to a blading system and method for controlling structural vibrations in axial-flow compressors, turbines or fans, as in aircraft engines and like turbomachines. This invention more specifically relates to a damper which is applied externally to the dovetail root attachments of rotor blades, and which does not necessitate structural modification to the rotor blades or the turbomachine incorporating these blades. The damper significantly suppresses destructive structural vibration, without affecting the aerodynamic performance of the turbomachine.

2. Description of the prior Art

The reliability of an axial-flow turbomachine in general, and a compressor in particular, depends on the durability of its component parts. The blading system of the turbomachine can, in the event of vibration fatigue, dangerously jeopardize such durability. Moreover, the geometry of the compressor blading system may enhance the vibration susceptibility. Vibration failures have generally been attributed to several sources, among which are the followings:

1. Forced vibrations due to mechanical obstructions which cause unequal pressure distributions in the blade path;
2. aerodynamic self-excited vibrations due to flutter phenomena; and
3. vibrations due to the rotating stall.

Considerable knowledge has been gained in recent years on the mechanism of vibration; however, the complexities introduced by combinations of the sources of vibration continue to make vibration fatigue an important problem in turbomachine operation. Many attempts to reduce vibration fatigue are based on the premise that this problem cannot always be thoroughly considered in the blading design, and therefore must be dealt with in the development or operation of the turbomachine. These solutions could require extensive structural and design modifications to the turbomachine as well as to the production and quality control lines.

Since the principal causes of vibration continue to be ever present, the possible suppression of the vibration lies in the amount of damping available to the blading system. It has been generally accepted, so far, that the inherent damping of the conventional blading system is insufficient in some instances to prevent blade failure. Reference is made to "A Vibration Damper for Axial-Flow Compressor Blading", M. P. Hanson, National Advisory Committee for Aeronautics, S.E.S.A. Proceedings, Volume XIV, No. 1.

Vibration induced fatigue failure of rotor blades is of a continuing concern to designers who take into account the following blade design criteria: Blade life prediction, allowable frequency margins which need to be justified on the basis of the intensity of resonant stresses, and accurate prediction of susceptibility to aeroelastic instabilities.

Contributions to inherent damping in a vibrating rotor blade stem from four principal sources:

1. Internal friction of the material;
2. dissipation of vibration energy to the environment;
3. transfer of vibration energy through the blade root and rotor to other members in the system having similar natural frequencies; and
4. dissipation of vibration energy by the mounting.

It has been believed that material damping is limited in currently used materials and has proven insufficient in systems susceptible to high amplitude vibrations. Aerodynamic damping, while very effective in reducing the vibration resulting from certain types of excitation, cannot be relied upon to dampen flutter types of vibration in which the very source of excitation is aerodynamic instability. The vibration-absorption method of providing damping is limited to systems having several components of similar natural frequencies. In compressors, it is difficult to maintain rotor blades at desired frequency ratios because of manufacturing tolerances, variations in mounting, and frequency changes due to centrifugal forces. Vibration energy dissipation in the mounting is due to relative motion between the blade and the rotor in mechanical blade attachments. At low rotor speeds the energy dissipation is appreciable; however, at high rotor speeds the centrifugal force essentially tightens the blade sufficiently to destroy the dissipation.

Damping, in the context of this application, refers to energy dissipation capacity of the component undergoing vibration. A measure of energy dissipation is defined as the ratio of energy lost per cycle of vibration to maximum vibration energy stored in the appropriate mode divided by 2. Where such a measurement is inadequate or impractical, the extent of damping present is measured indirectly as attenuation of strain in the vibrating components due to the influence of the damping mechanism.

Material or hysteretic damping refers to energy dissipation due to many complex mechanisms within a material, when a volume of the material is subjected to cyclic stresses. Accurate measurements show that cyclic stress-strain always has a hysteresis loop. Thus, material damping is always present in a vibrating rotor blade.

Friction damping at an interface depends on loading, roughness of surfaces, level of external excitation, slip amplitude, geometry of the contacting components, etc. For example, the root structure of a jet engine blade is typically of a dovetail, pin or fir tree design, the extent of friction damping being different in each design. In the case of shrouded blades, untwisting of the blades under centrifugal loading brings neighboring blades into contact at shrouds, resulting in a complex "joint" at the interface. Reference is made to "Turbojet Engine Blade Damping", A. V. Srinivasan et al., NASA Contract Report 165406, July 1981.

So far, no single analytical or experimental approach appeared feasible for the evaluation of all sources of damping, due to the diversity of mechanisms involved. Several methods have been proposed to limit vibration susceptibility in blade mechanisms. One of the most obvious methods is to control the source of vibration, such as by avoidance, which can prove to be inefficient and quite difficult to achieve. For instance, in some applications, such as in wind tunnels where axial-flow compressors are employed, avoidance may be achieved by reducing the energy level of the system in order to reduce the rotor blade vibrations. However, such a reduction in the energy level causes the system to operate below its intended operation design and optimal efficiency.

Another common method to limit vibration has been to increase the blade stiffness by increasing the blade thickness, shrouding the blades, or lacing the blades with wires. Still an alternative proposed solution has been to improve the material strength by using material that is less sensitive to metal fatigue, such as high fatigue strength metallic alloy or composites. However, these corrective measures may be harmful to the aerodynamic efficiency of the blading system, may create a structural problem in high-speed turbomachines, or may increase the manufacturing cost.

Another conventional method is via mechanical damping, which consists of various means of increasing the damping of a system by dissipating the vibration energy as frictional heat or through another system of similar natural frequencies. Many blade damping devices have been based on these principles, but the design usually adds to the complexity of the manufacture of the blade and sometimes can interfere with its aerodynamic performance. The above article by Hanson purports to address this problem by adding pins that contact the blade root and the rotor. The proposed damping mechanism introduces frictional forces into a compressor blading system, and requires an addition of an appendage at the base of the blade. However, such design modifications cannot be introduced universally into conventional turbomachines, and can prove to be quite expensive and impractical to retrofit into existing blading systems.

The two common types of mechanical dampers are tuned-mass and friction dampers. Tuned-mass damper works on the principle of adding a secondary mass, either internally or externally to the main structure, to absorb the vibration energy at a specific frequency to which the secondary mass is tuned to. An example of tuned-mass damping is the helicopter rotor systems. Friction damper provides a broader frequency range of application and relies on interface rubbing motion to dissipate the vibration energy. Snubber in turbine blade design, which is usually placed at mid-span to form an interlocking ring, is a form of friction damper as well as a stiffness modifier.

Most of these conventional damping methods often require structural modifications to the rotor blades. Such added modifications can reduce the aerodynamic performance of the turbomachine. This is generally the case with the snubber damper design. Tuned-mass damper usually has a narrow frequency range of application, while friction damper will eventually wear out the blades, thereby requiring extensive maintenance. These damping methods entail a high level of complexity and considerable manufacturing, design, and maintenance costs.

Other damping mechanisms of general interest to the present invention have also been designed and patented, some of which are described in the following patents:

U.S. Pat. No. 4,188,171 (1980), to Baskin, titled "Rotor Blade Internal Damper", describes a load absorbing elastic member which is incorporated internally into the design of a rotor blade to assist in reducing flapwise and chordwise bending moments, torsional loading, and to reduce the control system loads induced by rotor blade moment stall. The load absorbing elastic member has a constraining member which serves as a strain amplifier. However, this damping device and more particularly the constraining member, requires extensive and expensive modification to incorporate the device into the internal structure of the blade, and it applicability may be limited to new blade construction made of composite materials. This method cannot be used readily to retrofit the internal dampers into existing rotor blades due to its integral design feature.

U.S. Pat. No. 4,192,633 (1980), to Herzner, titled "Counterweighted Blade Damper", describes a segmented damper provided with a lower dovetail portion and insertable into a dovetail slot for radial retention. The damper is engageable on its face by a blade retainer for axial retention, such that the damper is pivotable in an axial plane. The damper upper portion has on its one side a flange for engaging the blade shank rail and on its other side a flange for shifting the damper center of gravity axially outward from the lower pivot point. Centrifugal force, occasioned by rotation of the disc and damper then causes the damper to pivot and impart an axial force against the blade to thereby dampen vibrations. This method exemplifies the complexity of a typical, conventional mechanical damper.

Therefore, there is still a significant and unsatisfied need for a damper and method for controlling structural vibrations in axial-flow compressors, turbines, fans as in aircraft engines, and like turbomachines. The damper should be applied externally to the various types of root attachments of rotor blades, such as dovetail, fir tree, or other attachments of different designs. The damper should not necessitate structural modification to the blades or the turbomachine incorporating these blades. It should provide significant vibration damping to suppress destructive structural vibration and thereby to increase the durability of the blading system and the turbomachine. Along with the minimization of structural fatigue, the damper should reduce acoustic noise accompanying high amplitude vibrations.

SUMMARY OF THE INVENTION

The present invention provides a unique damper and method for controlling structural vibrations in axial-flow compressors, turbines fans, aircraft engines, and like turbomachines, without affecting their aerodynamic performance.

The invention also provides a damper that could be applied externally to the dovetails of rotor blade roots, without structural modification to the blades or the turbomachine incorporating these blades.

The invention minimizes the structural vibrations of the rotor blades, regardless of their material composition.

Some advantages presented by the present damper lie in its simplicity, cost effectiveness, and ability to provide significant vibration damping and to reduce acoustic noise accompanying high amplitude vibrations. Yet another feature of this damper is its universal adaptability for retrofitting into existing turbomachines, for a wide range of different applications.

Briefly, the foregoing and other features of the present invention are achieved by providing a unique blading system and method for controlling structural vibrations in turbomachines including a stator disc and a rotor disc. The rotor disc defines several radial hubs that retain the rotor blading systems. Each blading system includes a blade formed of an airfoil, and a root attachment which is dimensioned to fit within, and to engage a corresponding hub. Viscoelastic dampers are selectively applied to the outer surfaces of the root attachment on which compressive or shear forces are likely to develop, intermediate the root attachment and the hub upon rotation of the rotor disc in order to dampen structural vibrations.

BRIEF DESCRIPTION OF THE DRAWING

The above and other features of the present invention and the manner of attaining them will become apparent, and the invention itself will be best understood, by reference to the following description and the accompanying drawings, wherein.

Similar numerals refer to similar elements in the drawing. It should be understood that the sizes of the different components in the Figures are not in exact proportion, and are shown for visual clarity and for the purpose of explanation.

DETAILED DESCRIPTION OF THE INVENTION

The description of the preferred embodiment that follows is based on a rotor blade damper originally developed by NASA Ames Research Center for the compressor of the 11-Foot Transonic Wind Tunnel, and subsequently extended to the compressor of the 12-Foot Pressure Wind Tunnel at NASA Ames Research Center. It should be noted, however, that the present invention can be utilized just as effectively in other types of rotor blades and applications.

Figure 1:
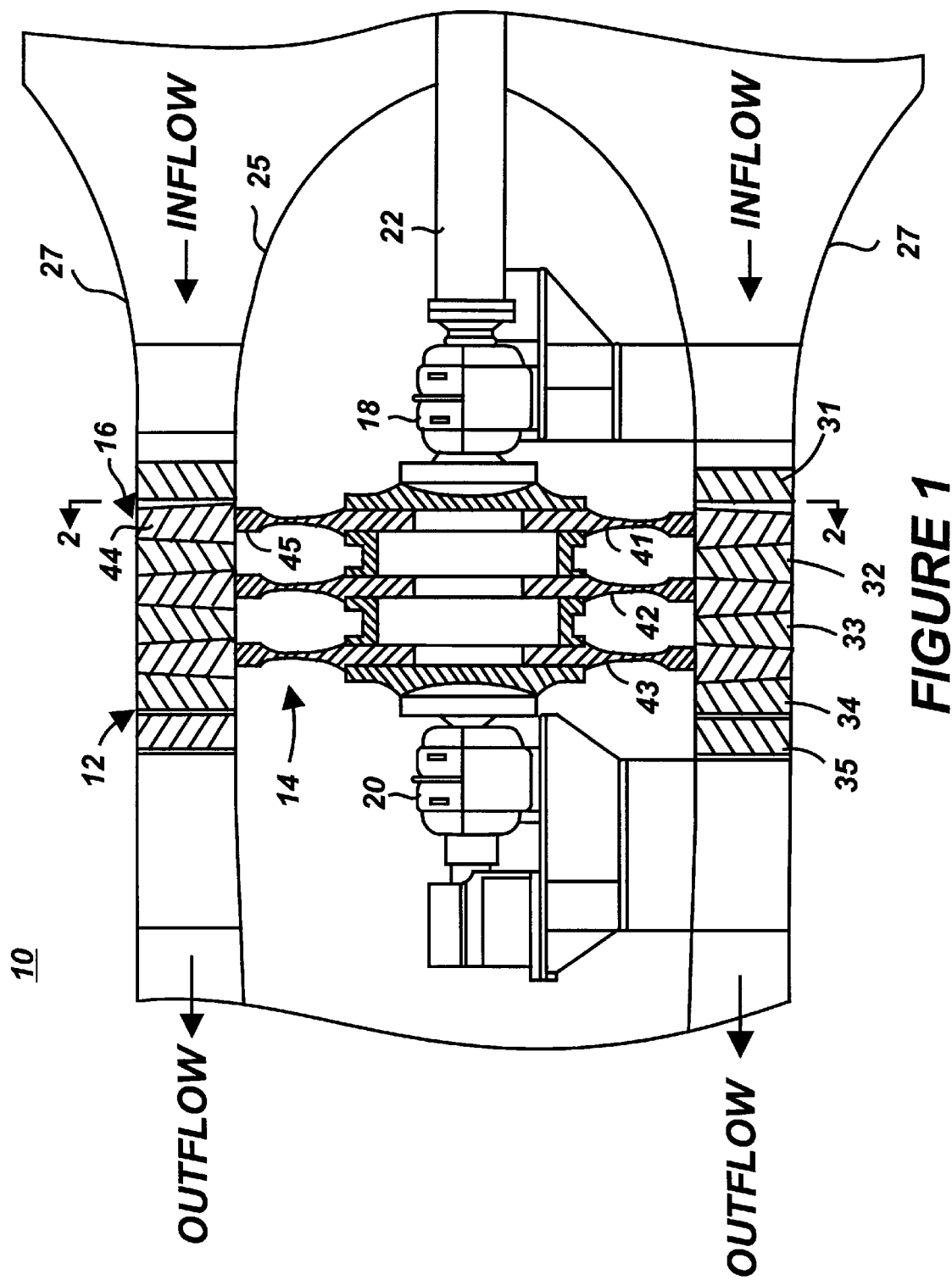
FIG. 1 is a schematic, partly cross-sectional side view of a compressor layout showing a stator, and a rotor including a rotor blading system according to the present invention.
Figure 2:
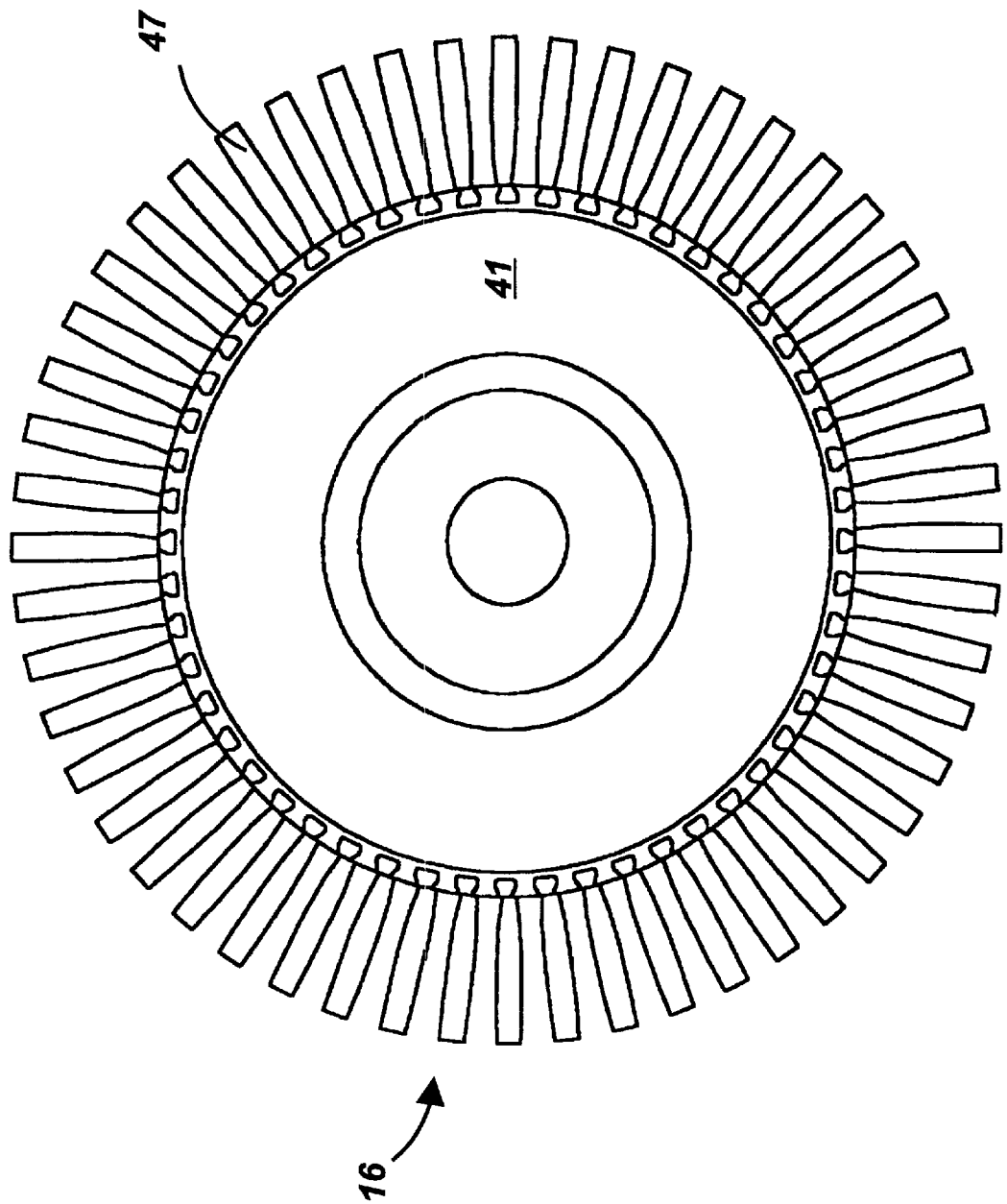
FIG. 2 is a front view of the rotor of FIG. 1, taken along line 2—2.

Turning now to FIG. 1, it illustrates a layout of a compressor 10 used in the 11-Foot Transonic Wind Tunnel at NASA Ames Research Center. The compressor 10 includes in its essential parts a stator 12, and a rotor 14 incorporating a rotor blading system 16 according to the present invention. Two bearings 18, 20 support the rotor 14 and connect it to a motor-driven rotating shaft 22. A nacelle 25 provides an inner flow guide, and an outer casing 27 provides an outer flow guide for the inflowing air.

The stator 12 includes a plurality of stator discs, for instance five stator discs 31, 32, 33, 34, 35 in this embodiment. Each of these stator discs includes a plurality of radial vanes. The present exemplary stator 12 includes five stator discs with the following vane distribution: The first stator disc 31 includes 54 inlet guide vanes, the second stator disc 32 includes 34 vanes, the third stator disc 33 includes 34 vanes, the fourth stator disc 34 includes 58 outlet guide vanes, and the fifth stator disc 35 includes 60 outlet guide vanes. It should however be understood that the present invention is not dependent on the number of stators or stator vanes.

The present exemplary three-stage rotor 14 includes three rotor discs 41, 42, 43. These rotor discs are identical, and therefore only one rotor disc 41 will be described in more detail. The rotor disc 41 terminates in a plurality of identical peripheral, radially extending hubs 45 that are formed within the rotor disc 41 to retain the blading systems 16 associated with the rotor disc 41.

The blading system 16 of the present invention is better illustrated in FIGS. 2 through 6, and includes a blade 44 and two identical dampers 46A, 46B. The blade 44 is a monolithic structure formed of an airfoil 47 and a root attachment 49. In this example, the airfoil 47 is essentially a twisted beam of variable cross sectional area, and the root attachment 49 is a dovetail shaped attachment which is dimensioned to fit within, and intimately engage the hub 45, particularly under rotation. The blades 44 are circumferentially spaced about the rotor disc 41, and radiate therefrom along the radial direction. Each of the blading systems 16 of the compressor 10 used in the 11-Foot Transonic Wind Tunnel at NASA Ames Research Center includes 52 blades 44 per rotor disc. It should be clear that the present invention is not dependent on the number of rotor discs or blades in the rotor 14, nor on the particular design of the airfoil 47.

The rotor blades 44 are excited harmonically by unsteady aerodynamic forces resulting from the passage of the rotor blades 44 in proximity to stationary vanes of the stator 12, located upstream and downstream of the rotor blades 44. The magnitudes of the vibration responses of the rotor blades 44 are strongly dependent upon the blade frequencies, magnitudes of the harmonic forcing functions and the total damping available to the rotor blades 44. Thus, the vibration of the rotor blades 44 can be controlled by the proper consideration of the three main sources of vibration. The critical speed of the rotor blades 44 can be avoided by the proper selection of the natural frequencies of the rotor blades 44 at the design stage. When axial dimensional limitation is not very crucial, such as in wind tunnel compressors, increasing the spacing between blade rows will reduce the level of forcing functions, which, in turn, leads to lower vibration responses.

If at all possible, it is recommended that the rotor blades 44 be made of material with a high damping characteristic, such as carbon-based composites. Nevertheless, metal is often the material of choice for rotor blades, due to such factors as its cost effectiveness and machinability. However, the damping characteristic of metallic blades is usually very low, and therefore can cause troublesome structural vibrations.

When the rotor disc 41 is rotated at a sufficient angular speed, the centrifugal force occasioned by such rotation cause the dampers 46A, 46B to engage the opposing surfaces of the rotor hub 45. When so engaged, the dampers 46A, 46B damp the vibrations of the rotor blades 44, and as further explained herein, provides a load path for the vibration energy to dissipate from the blading systems 16.

The method of introducing damping to the axial-flow compressor 10 according to the preferred embodiment of the present invention will now be described with particular reference to FIGS. 2 through 6. It includes the proper application and positioning of two dampers 46A, 46B to the outer surfaces of the dovetail root attachment 49 of each blade 44. Each damper, i.e., 46A, includes a thin shear layer of viscoelastic material which is placed at the interface surfaces between the dovetail root attachment 49 and the hub 45, so as to be compressed therebetween when the rotor 14 is rotating.

As used herein, a thin shear layer of viscoelastic material includes a viscoelastomer, which simultaneously exhibits a viscous and elastic behavior. A viscous behavior is generally defined as the ability of the material to significantly deform under load and to convert the energy stored by deformation into heat. An elastic behavior is the ability to exhibit a reversible deformation under load, with the elastic deformation being smaller than the viscous deformation.

The compressed damper 46A provides a load path through which the vibration energy of the blade 44 is dissipated from the blade 44. The viscoelastic property of the damper 46A enables it to dampen the vibration energy by deforming the viscoelastic material in shear. Consequently, the mechanical vibration energy is converted into shear strain energy in the viscoelastic material, which is then dissipated as heat, thereby raising the total damping of the rotor blades 44. This method of damping treatment has resulted in a significant increase in damping of the bending mode vibration, and an increase in damping of the torsion modes.

Figure 3:
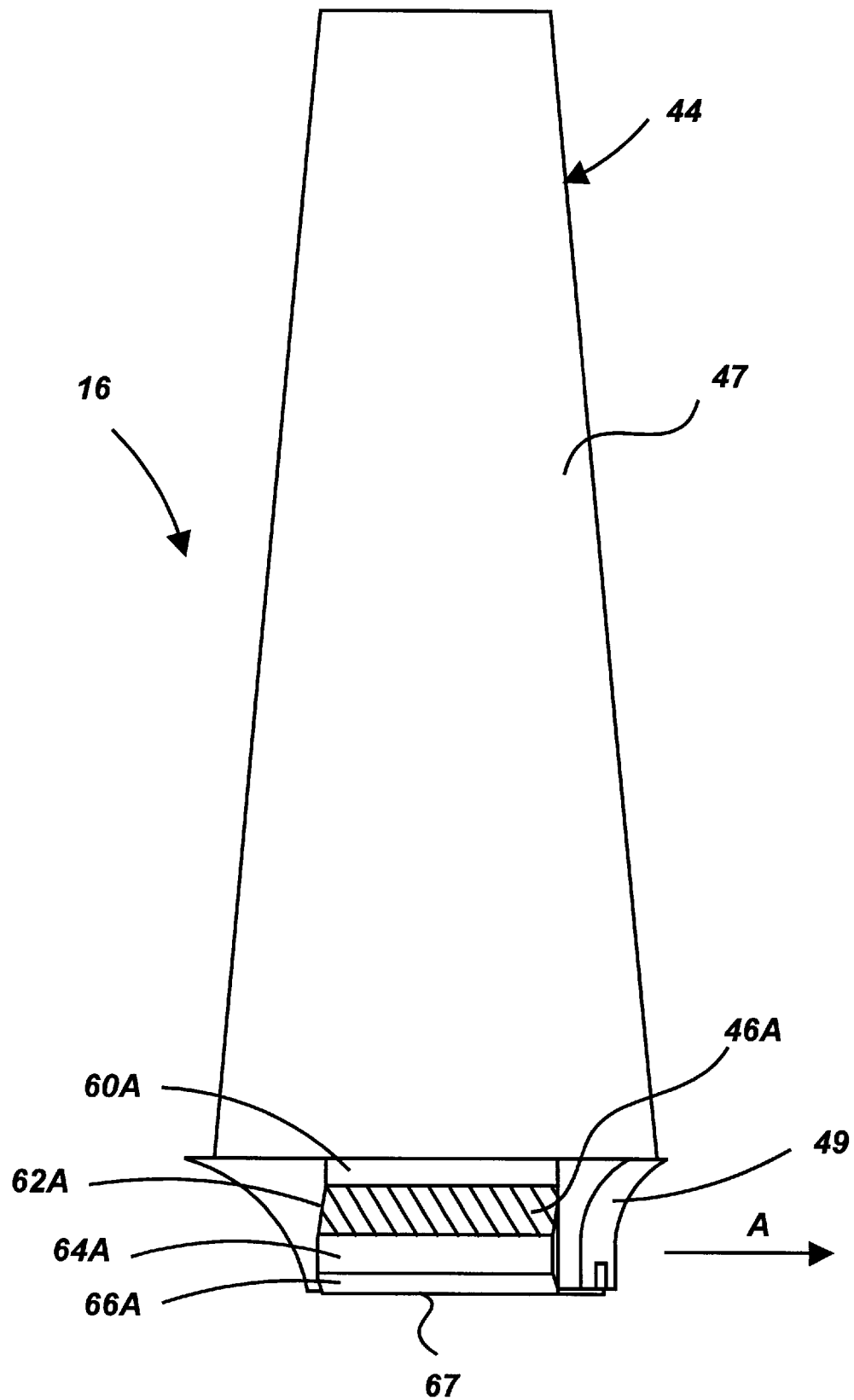
FIG. 3 is a plan view of a single blade forming part of the blading system of FIGS. 1 and 2, showing the damper secured to the external surface of a dovetail root attachment according to the teaching of the present invention.
Figure 4:
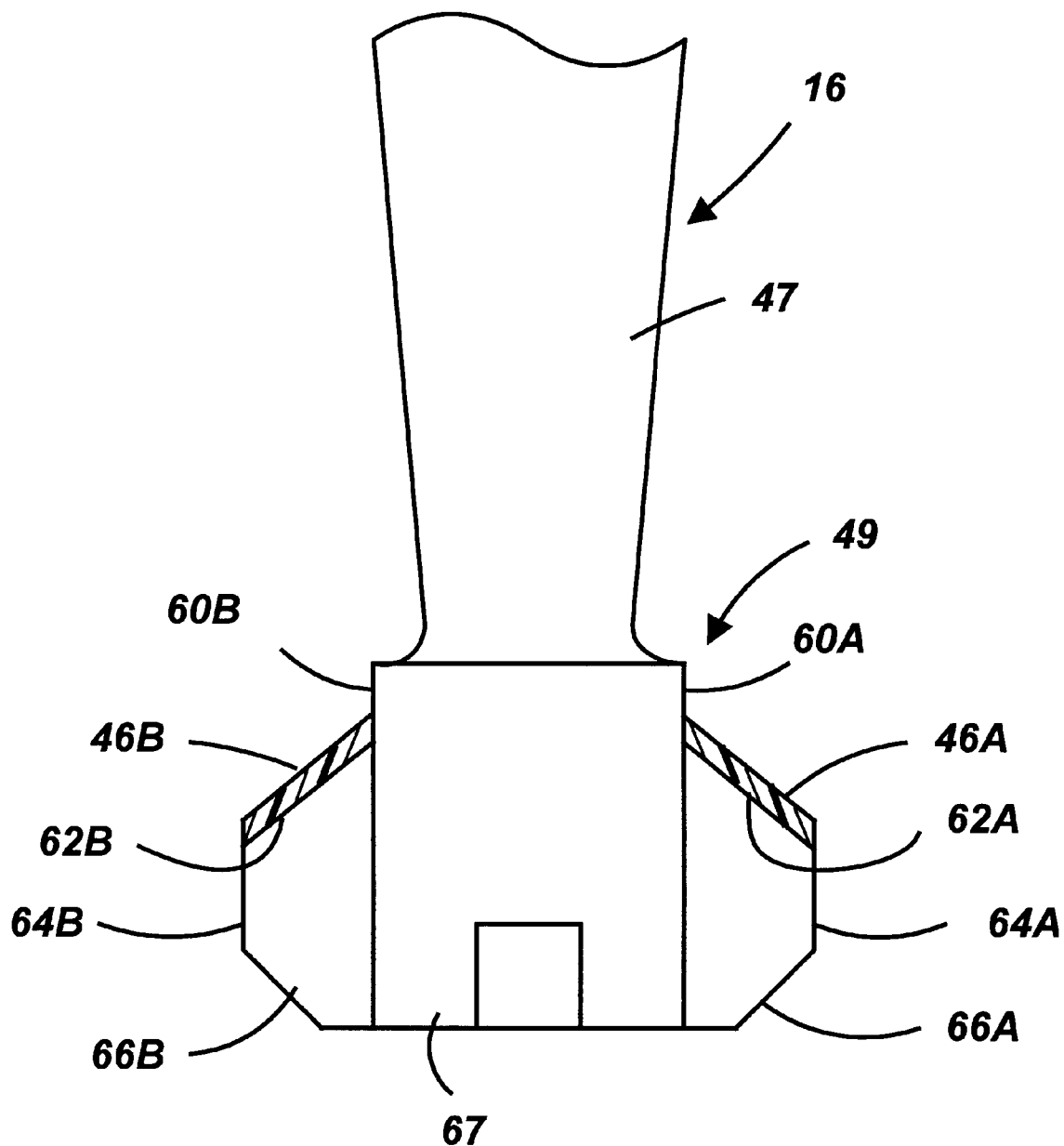
FIG. 4 is an enlarged side view of the blading system of FIG. 3 showing two opposite dampers secured to respective external surfaces of the dovetail root attachment.
Figure 5:
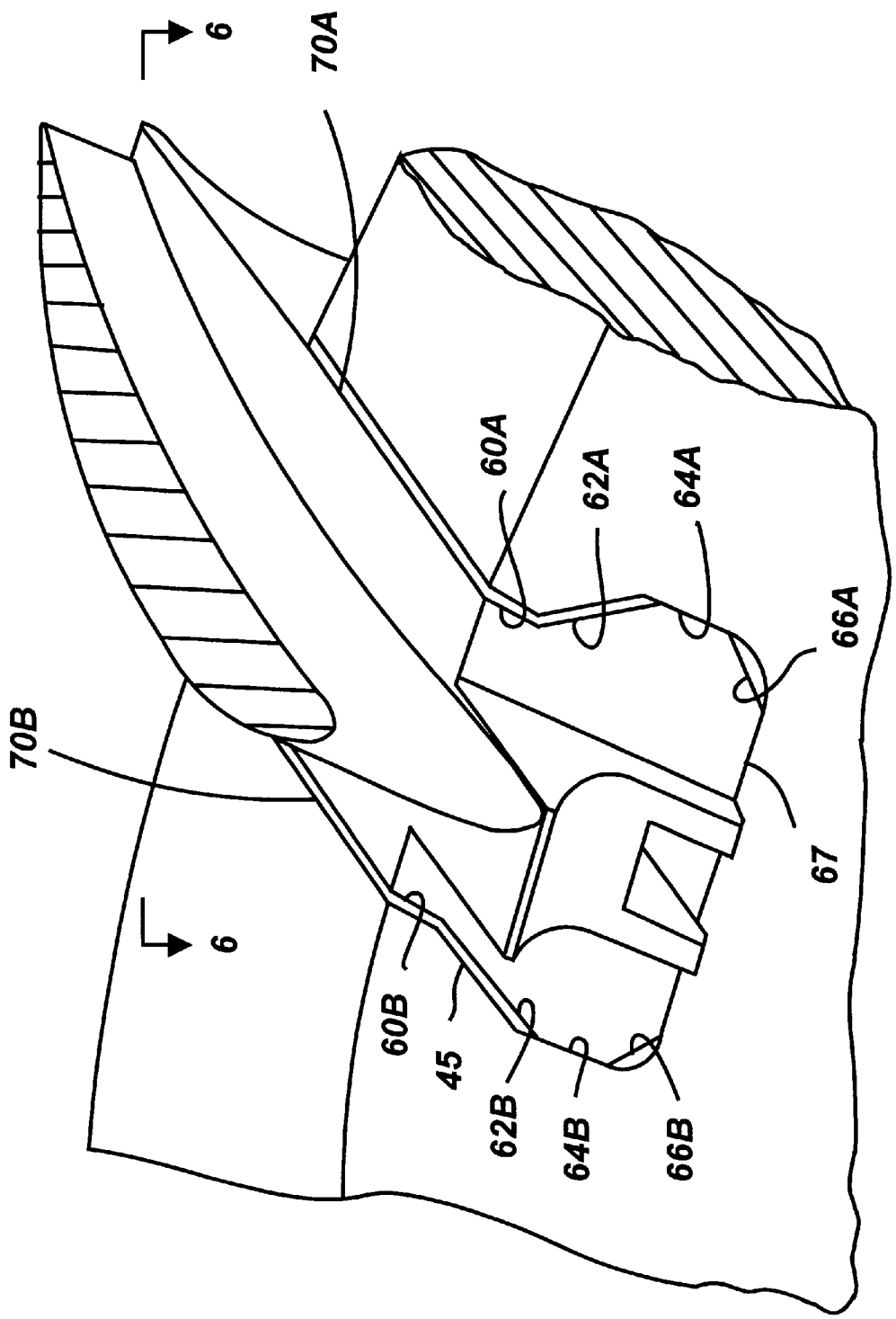
FIG. 5 is an enlarged isometric view of part of a rotor hub, shown engaging the rotor blading system of FIG. 3, with the dampers secured to the dovetail root attachments.
Figure 6:
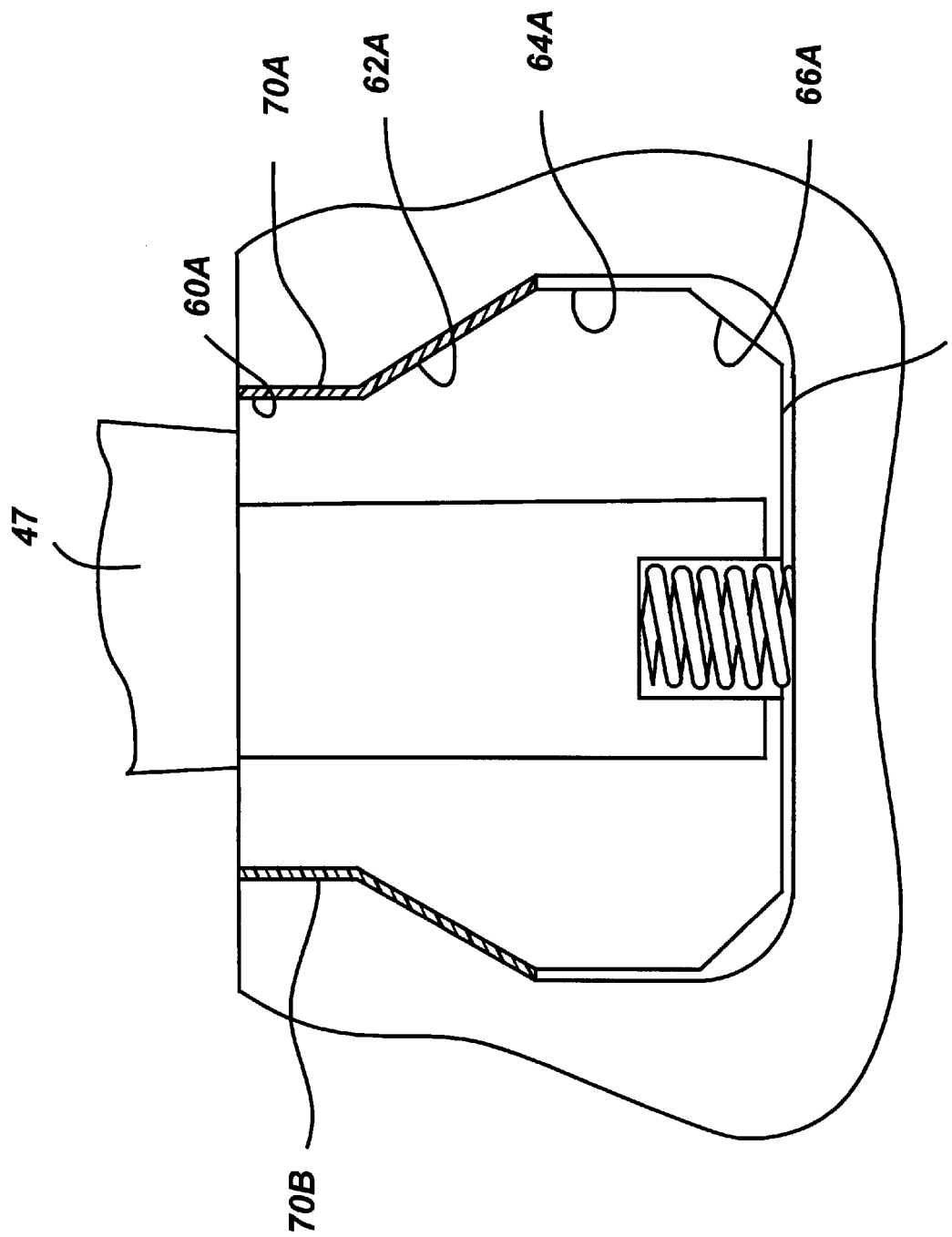
FIG. 6 is a further enlarged cross-sectional view of the dovetail attachment of FIG. 5, taken along line 6—6.

In order to better explain the positioning of the damper 46A onto the dovetail root attachment 49, the shape of the relevant surfaces of the dovetail root attachment 49 will now be described. The dovetail root attachment 49 of the preferred embodiment is mainly a metal block which is shaped to fit inside the stator hub 45. It should however be understood that other materials may alternatively be used. The dovetail root attachment 49 includes two opposite shoulders 60A, 60B that are vertically oriented when the blade 44 is in an upright position, as illustrated in FIGS. 3 and 4. Each of these shoulders 60A, 60B extends into a slanted side 62A, 62B, respectively, which is inclined at a predetermined angle relative to its corresponding shoulders 60A, 60B. In turn, each of the slanted sides 62A, 62B extends into a vertical shoulder 64A, 64B, respectively, which, in turn extends into two slanted sides 66A, 66B, and therefrom into a common horizontal base 67.

According to the embodiment of FIGS. 3 and 4, two dampers 46A and 46B are secured to at least part of the outer surfaces of the slanted sides 62A and 62B. In an alternative embodiment shown in FIGS. 5 and 6, the dampers 70A, 70B cover the entire outer surfaces of the shoulders 60A, 60B, and the slanted sides 62A, 62B. It should be understood that in other embodiments, the dampers 46A, 46B may cover other outer surfaces of the dovetail root attachment 49. For instance, the dampers 46A, 46B may cover all the dovetail surfaces as well as any available non-load bearing outboard area of the dovetail root attachment 49. Once the dampers 46A, 46B are positioned, the dovetail root attachment 49 is slid inside the rotor hub 45, as indicated by the arrow A (FIG. 3) to engage the blading system 16 to the rotor disc 41.

The damper 46A may be made from industrial-grade polyurethane of high durometer. This material is available in an adhesive tape form. The adhesive on the polyurethane tape is bonded to the outer surfaces of the dovetail root attachment 49, as described above, following appropriate surface treatment performed on the rotor blades 44. The selection of the appropriate viscosity for the damper 46A depends on the load and specific application. For instance 3M's 8561 Scotch TM polyurethane protective tape was selected for use in the compressors of the 11-Foot Transonic Wind Tunnel and 12-Foot Pressure Wind Tunnel at NASA Ames Research Center. It should be noted that other viscoelastic tapes with a high tensile strength may act as an appropriate damping medium. Exemplary viscoelastic materials include for instance, rubber, adhesive, cellular urethane, adhesive transfer tapes, butyl rubber and Neoprene.

The dovetail root attachment 49 is subjected to large normal pressure resulting from the rotational centrifugal force. The high temperature environment in turbomachine presents additional problems to viscoelastic material. In the case of the three-stage compressor 10 shown in FIG. 1, the normal pressure exerted on the dovetail root attachment 49 at the maximum operating speed of 685 rpm is approximately 8000 psi, and the compressor exit temperature is about 200° F. Under such a severe operating environment, many adhesive based viscoelastic tapes will break down or creep rapidly to diminish the damping over a short time. Therefore, the selection of the proper material for the dampers 46A, 46B is important.

In addition to the normal pressure on the dovetail root attachment 49 which may affect the material durability, high temperature can cause deleterious consequence to viscoelastic materials, as high temperature will accelerate the material breakdown. Nevertheless, most materials that were tested, including polyurethane, have good temperature resistance of up to 400° F., as well as high tensile strength to withstand the normal pressure on the dovetail. Because of these suitable material properties, polyurethane was eventually selected as the damping material of choice. As mentioned earlier, the selected commercial polyurethane product is available in a tape form with adhesive on one side to facilitate bonding to the outer surfaces of the dovetail root attachment 49. The tape thickness may be 0.012 inch in the preferred embodiment, or it can be of any size deemed suitable for a given application. The tape is thin enough to fit in the existing clearance between the dovetail root attachment 49 and the hub 45. In use, the damping tape, i.e., dampers 46A, 46B, is simply cut to the desired area of the dovetail root attachment 49, and then applied to all the rotor blades 44. This application process is straightforward and simple, and requires only minor treatment, i.e., cleaning, of the dovetail surfaces.

The invention provides an additional advantage of allowing simple and very inexpensive modification of existing turbomachines to incorporate the damper 46A of the present invention. The damper 46A is not exposed to the airstream, and therefore it does not affect the aerodynamic performance of the turbomachine. Additionally, the invention is well suited for a wide range of shapes and sizes of rotor blades 44, and has been experimentally proven, in the three-stage compressor of the 11-Foot Transonic Wind Tunnel at NASA Ames Research Center, to provide an extended service life in a high-g environment, i.e., at least 800 hours at 1300 g's and 200° F.

In one experiment, damping was measured by placing the test rotor blade 44 in a fixture (not shown) designed to simulate the blade end condition in the compressor 10. The fixture is a large steel mass weighing approximately 2000 lbs compared to a 90 lb-blade. A hydraulic jack inside the fixture is capable of exerting a full damping force on the blade 44 equivalent to the centrifugal force at 645 rpm. The damping of the blade 44 was measured using the impact hammer technique with a dynamic signal analyzer. In addition, the blade damping was also measured in the stationary rotor hub. The results of the experimental damping measurements are shown in the following Tables 1 and 2, and illustrated in FIGS. 7 and 8.

As used in Tables 1 and 2, the mode designations, i.e., 1B, provide information about the order of the mode, i.e., 1, 2, 3, and 4, as well as the type of vibration, i.e., B and T. In the mode order designations, 1 refers to the fundamental frequency of vibration, and the remaining numbers refer to the higher order modes of vibration. In the vibration type designations, B refers to the flapwise or edgewise bending associated with vibration, while T refers to the torsion associated with vibration.

Table 1 provides damping rates measured in stationary hub at specific frequencies, without the dampers 46A, 46B of the present invention, and Table 2 provides damping rates at comparable frequencies, with the dampers 46A, 46B in place. A comparative analysis of these two tables indicates that the damping of the bending modes of the blades 44 measured in stationary discs has increased by a factor 6 to 10 times, while torsion damping has about doubled.

TABLE 1

Frequencies and Damping Rates Without the Dampers:

| Mode | Frequency (Hz) | % Damping |
| --- | --- | --- |
| 1B | 52.7 | 0.2 |
| 2B | 160.8 | 0.2 |
| 1T | 305.0 | 0.2 |
| 3B | 387.1 | 0.2 |
| 2T | 555.0 | 0.2 |
| 4B | 683.1 | 0.2 |

TABLE 2

Frequencies and Damping Rates With the Dampers:

| Mode | Frequency (Hz) | % Damping |
| --- | --- | --- |
| 1B | 52.6 | 1.3 |
| 2B | 152.9 | 1.7 |
| 1T | 307.5 | 0.4 |
| 3B | 379.6 | 2.1 |
| 2T | 547.9 | 0.4 |
| 4B | 661.4 | 1.6 |

Figure 7:
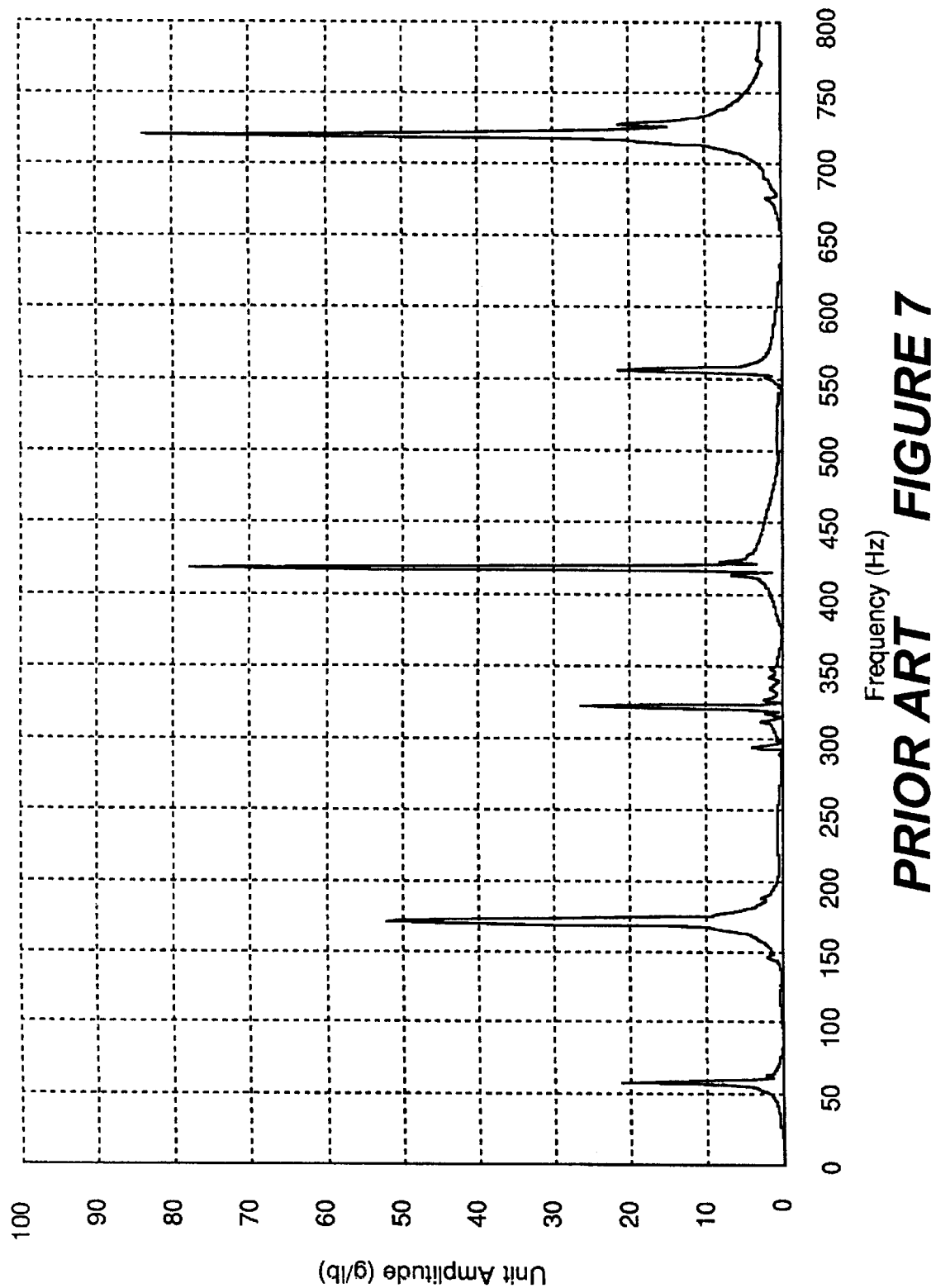
FIG. 7 is a graph plotting the amplitude of vibration versus frequency, of a conventional rotor blade not incorporating the damper of the present invention.
Figure 8:
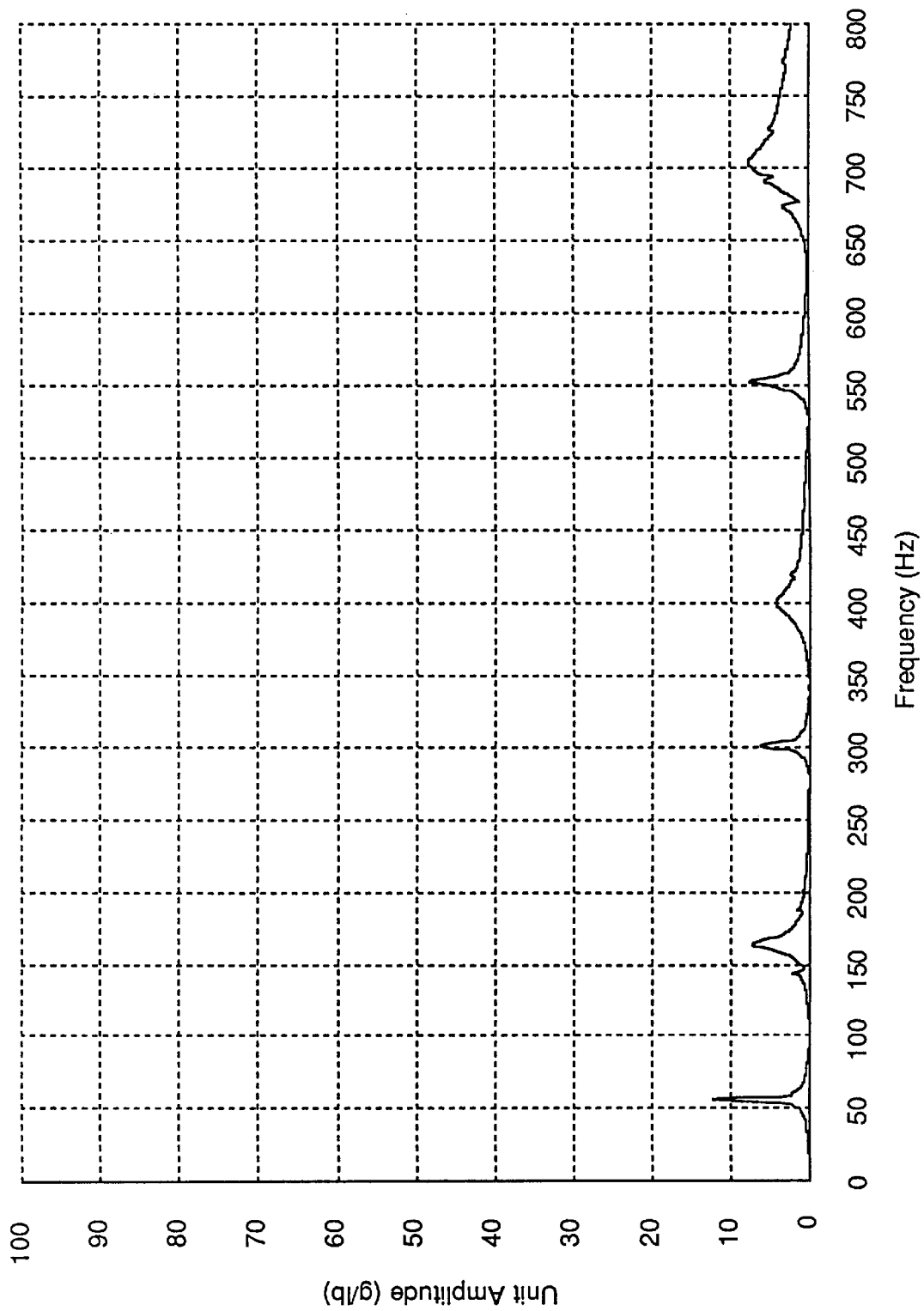
FIG. 8 is a graph plotting the amplitude of vibration versus frequency, of the rotor blade of FIG. 3, using the damper of the present invention.

Referring to FIGS. 7 and 8, the comparative analysis of the plotted amplitudes of vibration, as measured in the fixture, over a broad frequency range, without the dampers 46A, 46B (FIG. 7), and with the dampers 46A, 46B (FIG. 8) invariably indicates a significant increase in the damping level resulting from the dampers 46A, 46B.

The placement of the viscoelastic dampers 46A, 46B at the dovetail root attachment 49 also modifies the rigid interface between the blading system 16 and the rotor disc 41 to a softer connection, as the dampers 46A, 46B tend to behave like springs. This explains the reduction in the blade frequencies between Tables 1 and 2. Because of the modification of the blade boundary condition, the possibility of alteration of mode shapes exists. To verify this, modal participation factors from various strain gauges on the test blade were measured and compared for any differences. As used in this context, modal participation factor is defined as the ratio of local response to maximum response of a given mode. The results of the test confirm that the difference in mode shapes with and without the dampers 46A, 46B is negligible.

Figure 8A:
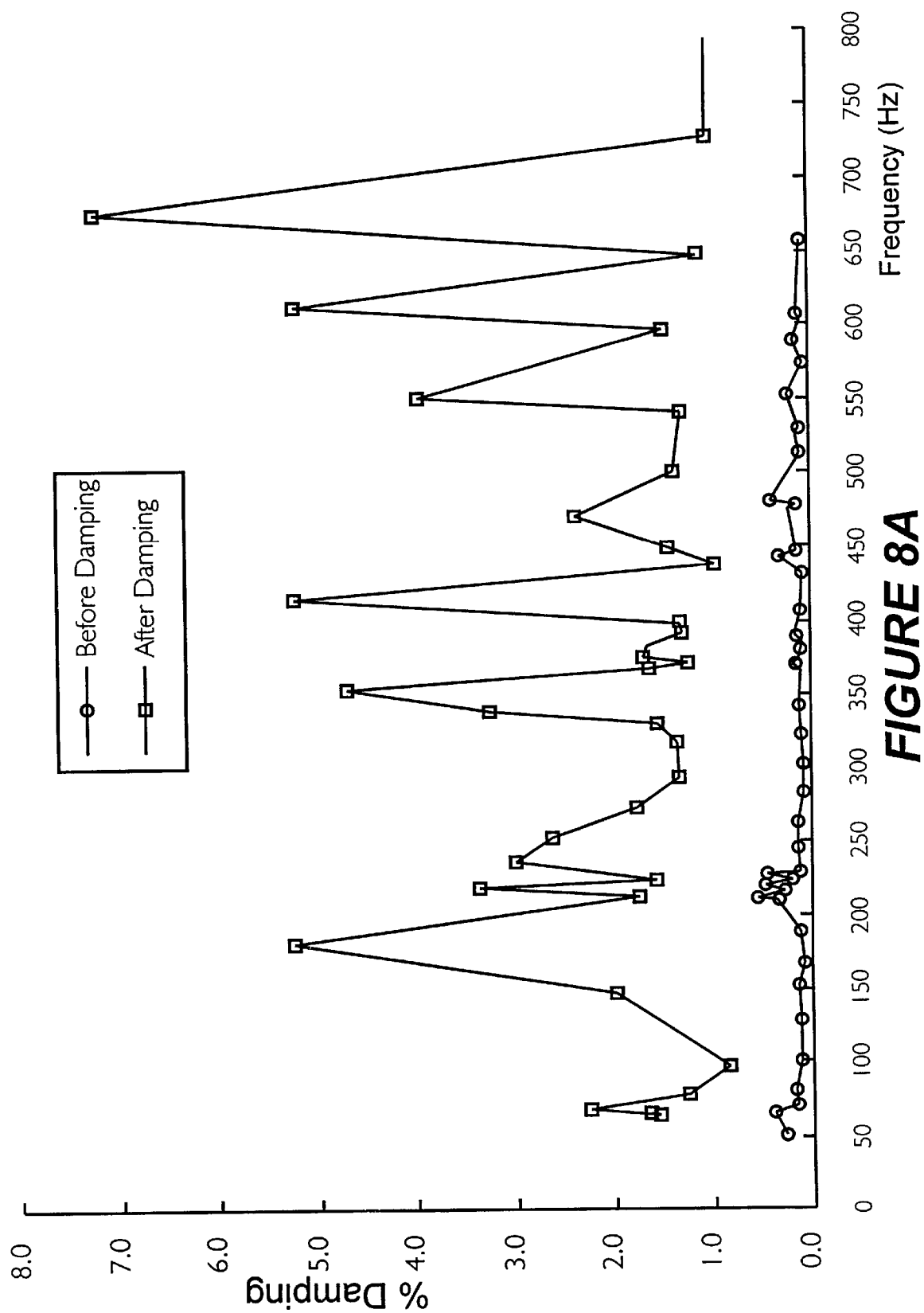
FIG. 8A is a graph plotting the system damping versus frequency, of the rotor blading system and the rotor hub.

In an experimental setup to measure the dynamic stress reduction, and to monitor the blade damping effectiveness, 15 rotor blades, 5 in each stage, were instrumented with two strain gauges one each at maximum bending and torsion stress locations. Prior to operating the compressor 10, all the rotor blades 44 were measured for frequencies and modal damping values, which established the baseline measurements. In addition, a modal analysis of one of the rotor discs, i.e., 41, with all rotor blades attached was performed to ascertain the improvement in the system damping. Typically, the damping of the rotor disc 41 with metal rotor blades 44 is very low, with the damping about 0. 1%. By retrofitting the dovetail root attachment 49 with the dampers 46A, 46B, the system damping of the rotor disc with the attached rotor blades is significantly raised, as shown in FIG. 8A.

Subsequent measurements of rotor blade resonant stresses confirmed the measured damping of the rotor blading system 16. Significant reduction of all resonant stresses throughout the operating envelope of the three-stage compressor 10 was realized, with a larger decrease in bending resonant stresses. In addition to stress reduction of the blading system 16, the responses of all instrumented blades were noted to be very uniform, unlike the original system which exhibited a large stress variance among the measured, blades. This undesirable and common stress variance phenomenon is referred to as mistuning.

Figure 9:
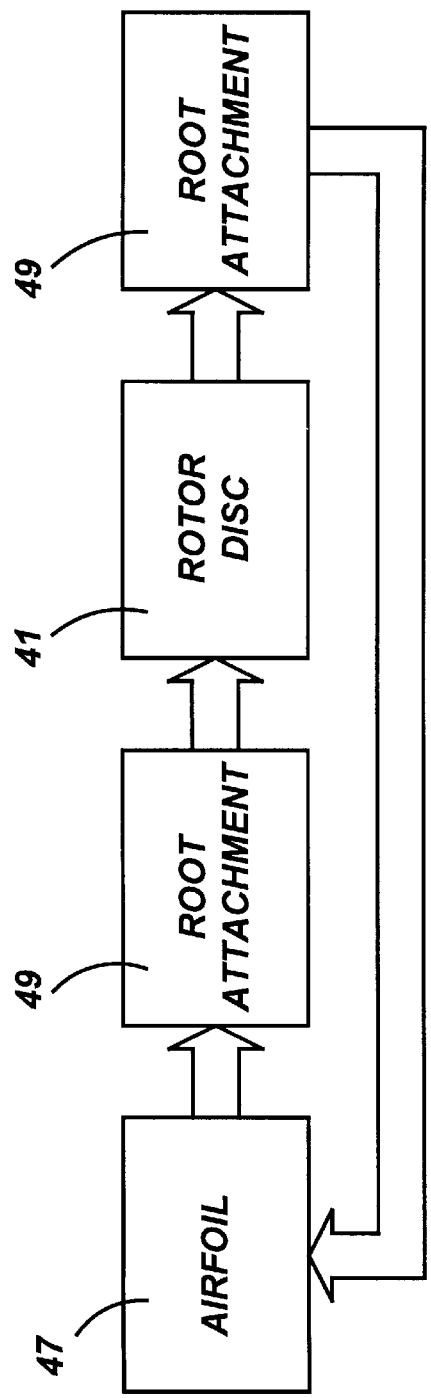
FIG. 9 is a simplified block diagram of the energy flow through a conventional rotor blading system not incorporating the damper of the present invention.

Referring now to FIG. 9, it illustrates the energy flow of the structural vibration through a conventional blade that has not been retrofitted with the dampers 46A, 46B of the present invention. The vibration energy, which is derived from the aerodynamic excitation, originates in the airfoil 47 and propagates to the root attachment 49 and thereafter to the rotor disc 41, and back to the root attachment 49, thus forming a closed loop path. The self-contained vibration energy is therefore shared among the rotor blades 44 in an unequal and random fashion, therefore resulting in the mistuning phenomenon.

Figure 10:
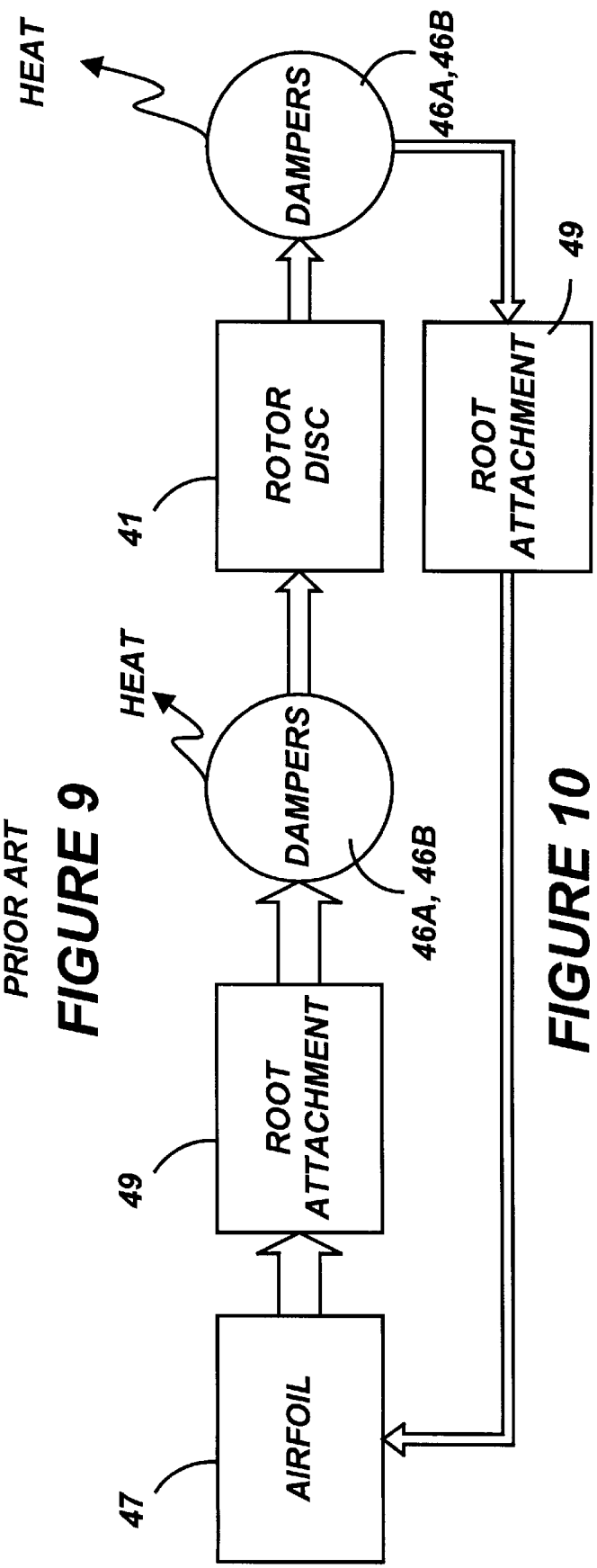
FIG. 10 is a simplified block diagram of the energy flow through a conventional rotor blading system incorporating the damper of the present invention.

Considering now the energy flow of the structural vibration through the blading system 16 of the present invention, with reference to FIG. 10, the vibration energy originates in the airfoil 47 and propagates to the dovetail root attachment 49, as is the case with the conventional arrangement of FIG. 9. However, as described earlier, as the rotor disc 41 rotates, the dampers 46A, 46B are compressed between the dovetail root attachment 49 and the rotor hub 45 to provide a load path along which the vibration energy dissipates. As a result, the vibration energy is significantly damped, and only a small residual energy, if any, may propagate to the rotor disc 41. The damped vibration energy is dissipated by the dampers 46A, 46B into heat. On the other hand, because the rotor disc 41 is a metallic structure, and as such it cannot act as an energy sink, the residual energy transmitted to the rotor disc 41 tends to return back to the blading system 16, only after it has been further dissipated by the dampers 46A, 46B. The residual vibration energy, if any, is then transferred to the root attachment 49 and the airfoil 47. In essence, the dampers 46A, 46B drastically reduces the flow of vibration energy between the rotor blades 44 and the rotor disc 41. The resulting vibrations of the rotor blades 44 then become much more uniform than the corresponding distribution of the vibration energy without the dampers 46A, 46B. Thus, the dampers 46A, 46B also provide an added benefit in minimizing the undesirable mistuning which often exists in a turbomachine, by increasing the system damping as described above.

Figure 11:
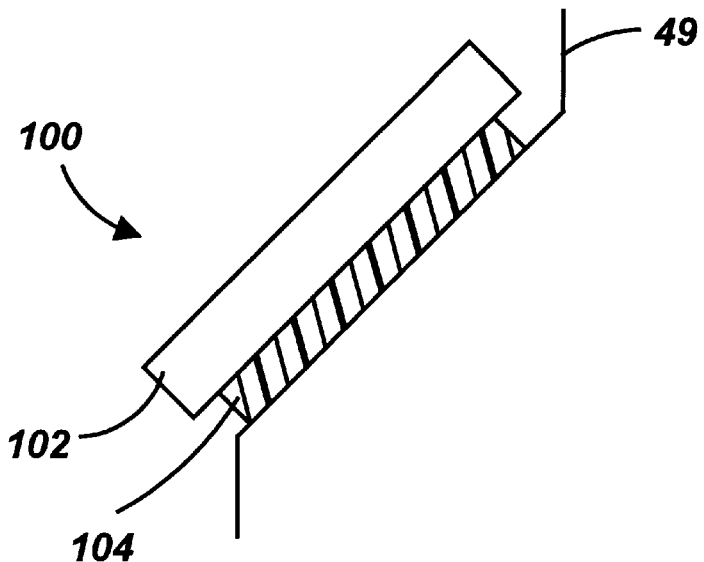
FIG. 11 is a side view of an alternative damper including a rigid plate.

FIG. 11 is a side view of an alternative damper 100, which replaces one of the dampers 46A, 46B, and which is shown abutting the dovetail root attachment 49 (shown in dashed lines). The viscoelastic damper 100 includes a rigid plate 102 bonded to a viscoelastic member 104 which, in a tape form, is similar to the dampers 46A, 46B. The plate 102 may be made of any material that is adequate for the particular application for which the damper 100 is intended. In one embodiment, the viscoelastic member 104 includes an adhesive on both sides for bonding to the plate 102, and the outer surface of the dovetail attachment 49.

Figure 12:
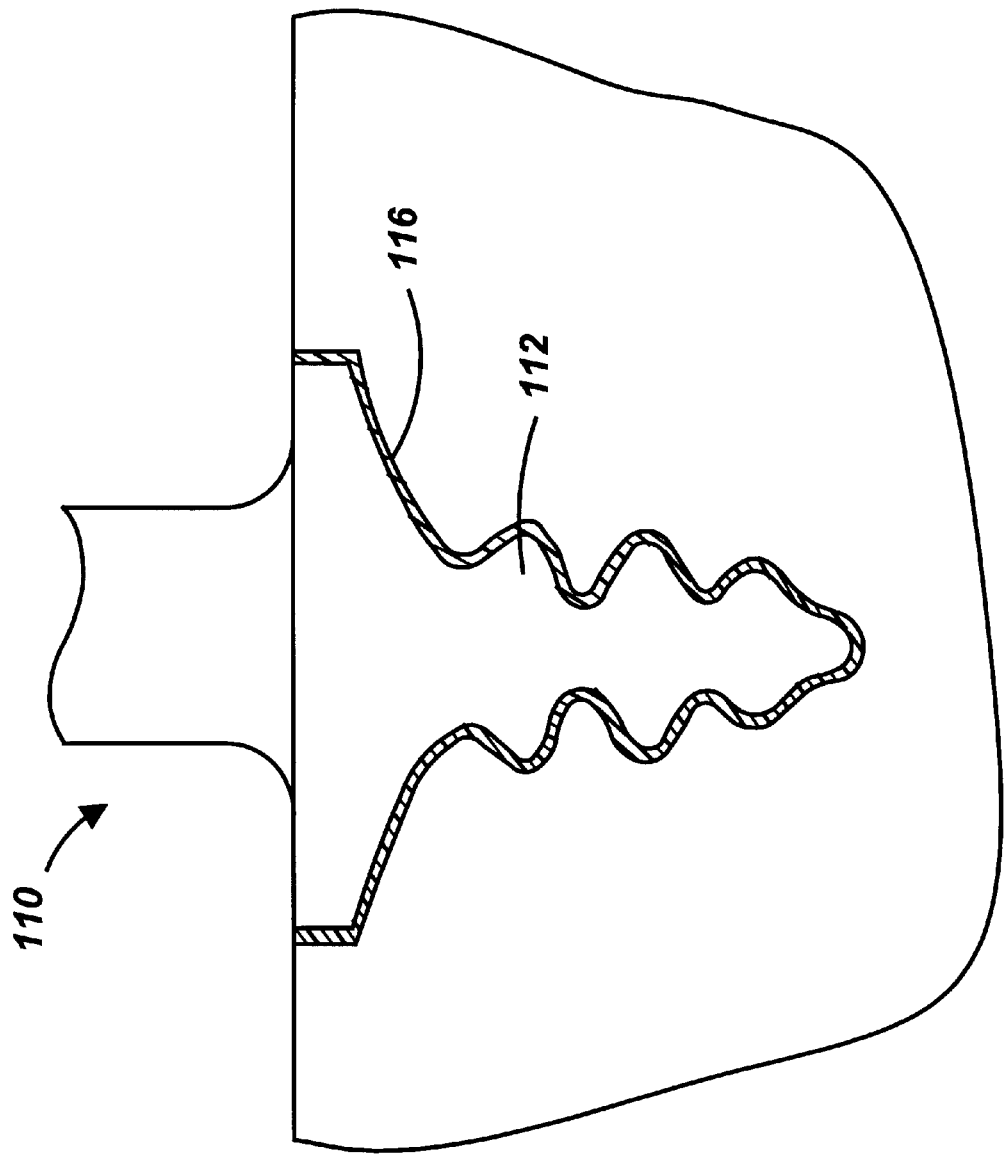
FIG. 12 is a side view of an alternative blading system having a fir tree root attachment.

FIG. 12 is a side view of an alternative blading system 110 having a fir tree root attachment 112, for use in high speed turbomachines. A damper 116 of the same or similar composition to that of the dampers 46A, 46B, envelopes the fir tree root attachment 112. In another embodiment, the damper 116 is selectively placed on the root attachment 112 at the locations where compressive or shear forces are most likely to occur. For instance, when it is unlikely that a compressive or shear force will develop, then the damper 116 does not necessarily cover the root attachment 112. However, in some designs, it might be preferable or even more convenient to shroud the entire root attachment 112 with a single damper 116 in order to maintain the structural integrity of the damper 116, and possibly for added retention and durability. Such selective placement of the damper relative to the outer root attachment is not limited to the embodiment illustrated in FIG. 12, but may also be applicable to the other embodiments described herein.

Figure 13:
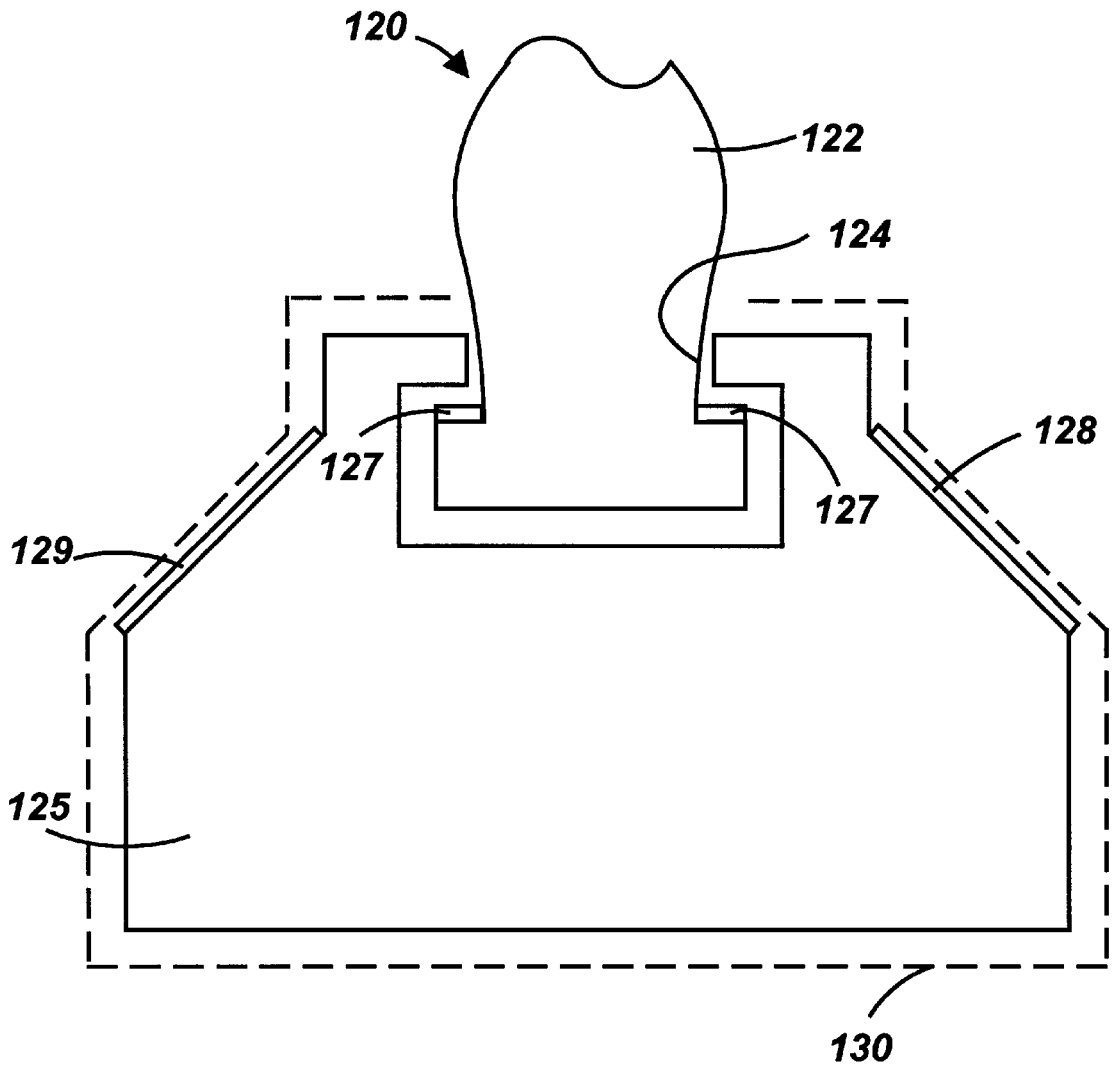
FIG. 13 is a side view of another alternative blading system having a round collar fitting inside an adapter.

FIG. 13 is a side view of another alternative blading system 120 for use in turbo prop engines. The blading system 120 includes a blade 122 having a round collar 124, a dovetail shaped adapter 125 which receives the round collar 124, and a plurality of dampers 127, 128, 129 with a similar composition to that of the dampers 46A, 46B. The damper 127 is secured to, and around part of the round collar 124 where compressive forces are likely to develop. Once the blade 122 is fitted within the adapter 125, it becomes almost functionally similar to the blading system 16, and is mounted within a corresponding rotor hub 130 (shown in dashed lines). The dampers 128, 129 could be similar to the dampers 46A, 46B, or even the damper 100 of FIG. 11. It should be understood that some of the dampers 127, 128, 129 may not be necessary in certain applications, provided there is sufficient damping along the load path, as explained above in relation to FIG. 10. For instance, in some applications it would be adequate not to use the damper 127, while in other applications the blading system 120 will exhibit sufficient damping properties without the dampers 128, 129.

Figure 14:
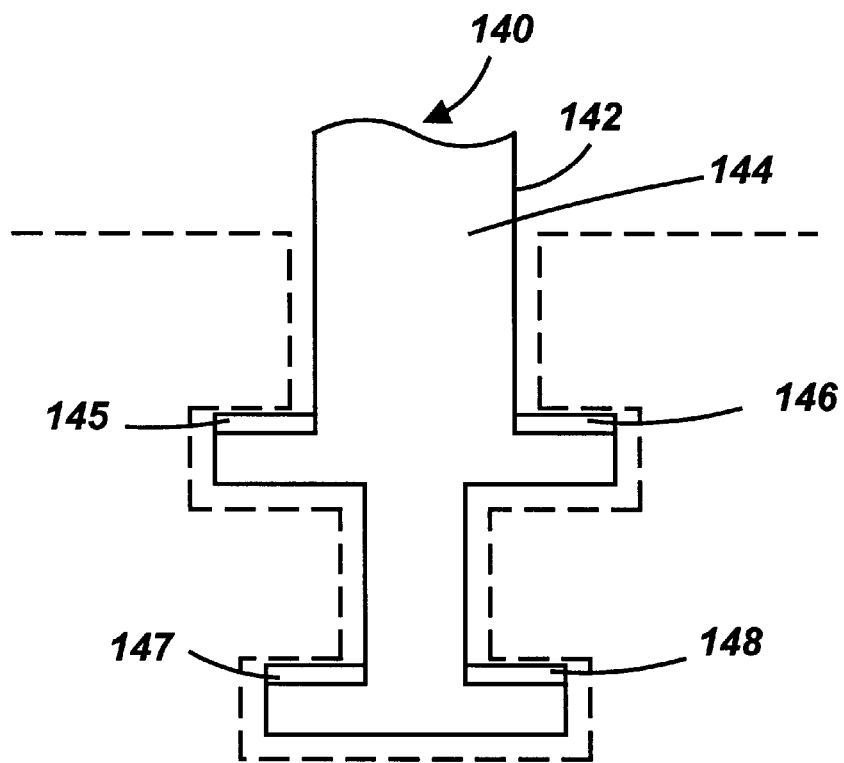
FIG. 14 is a side view of still another alternative blading system having a T-block root attachment.

FIG. 14 is a side view of still another alternative blading system 140 for use in high pressure impulse stages of large steam engines and in some gas turbines. The blading system 140 is comprised of a blade 142, a generally T-shaped root attachment 144, and a plurality of dampers 145, 146, 147, 148 with a similar composition to that of the dampers 46A, 46B or that of the damper 100. These dampers 145–148 are secured or bonded to the selected outer surfaces of the root attachment 144, where compressive forces are most likely to develop. FIG. 14 illustrates some of these selected outer surfaces. It should however be understood that other surfaces of the root attachment 144 may additionally or alternatively be covered with dampers. In one exemplary embodiment the root attachment 144 is generally cylindrically shaped, and is enveloped almost completely with a damper.

Figure 15:
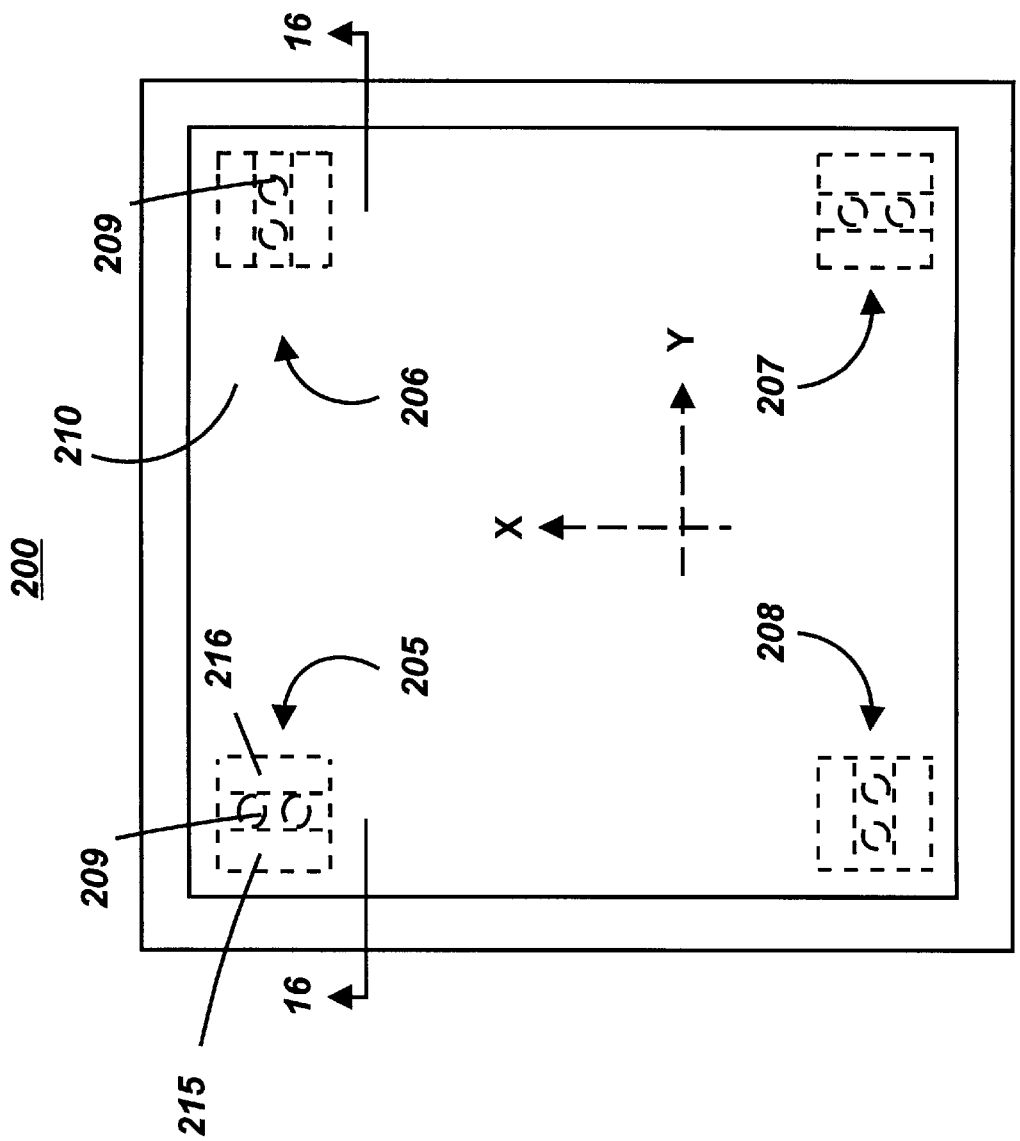
FIG. 15 is a top plan view of a static structure, such as an isolation table shown using the damper of the present invention.
Figure 16:
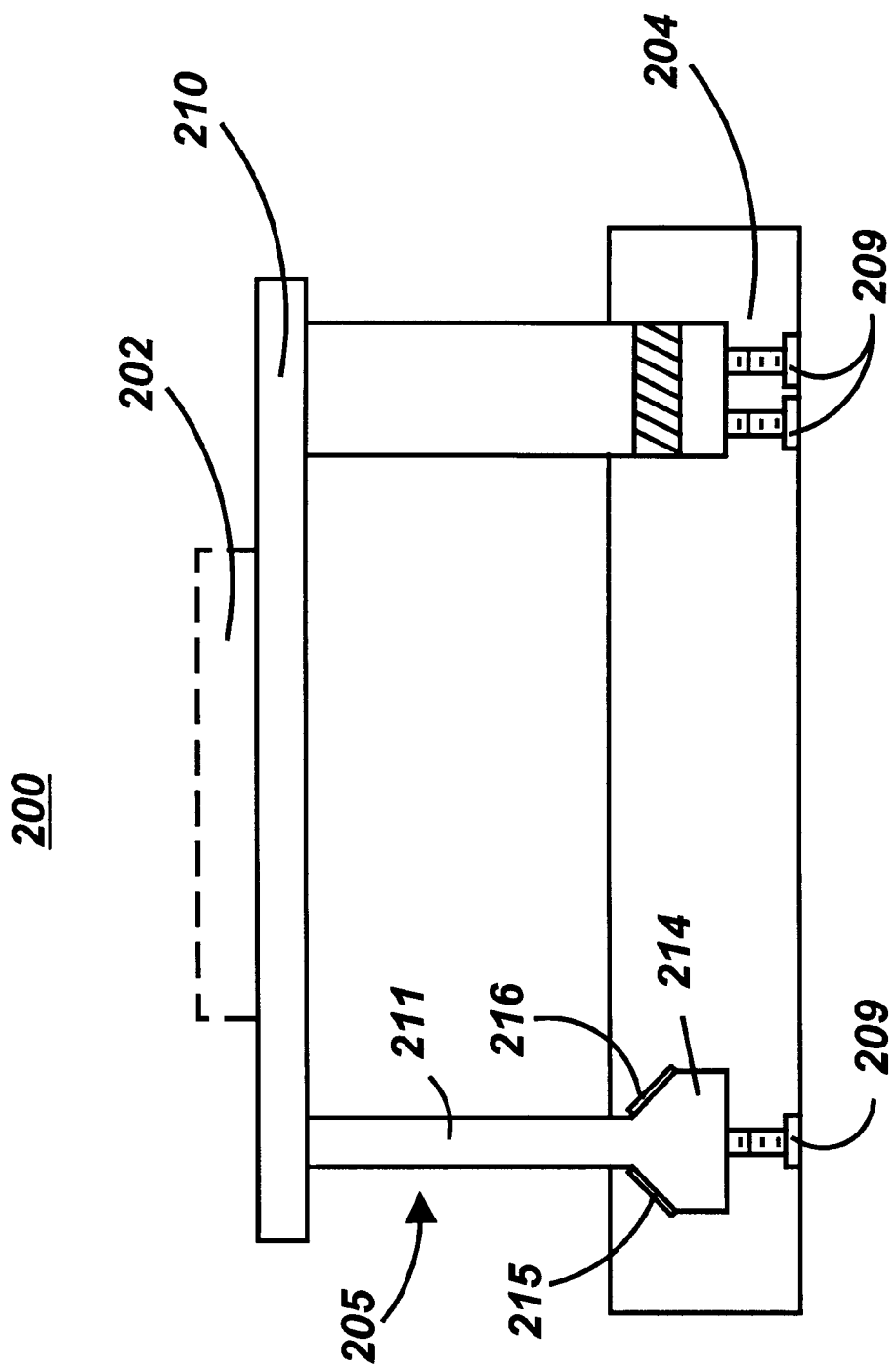
FIG. 16 is a side view of static structure of FIG. 15, taken along line 16—16.
Figure 18:
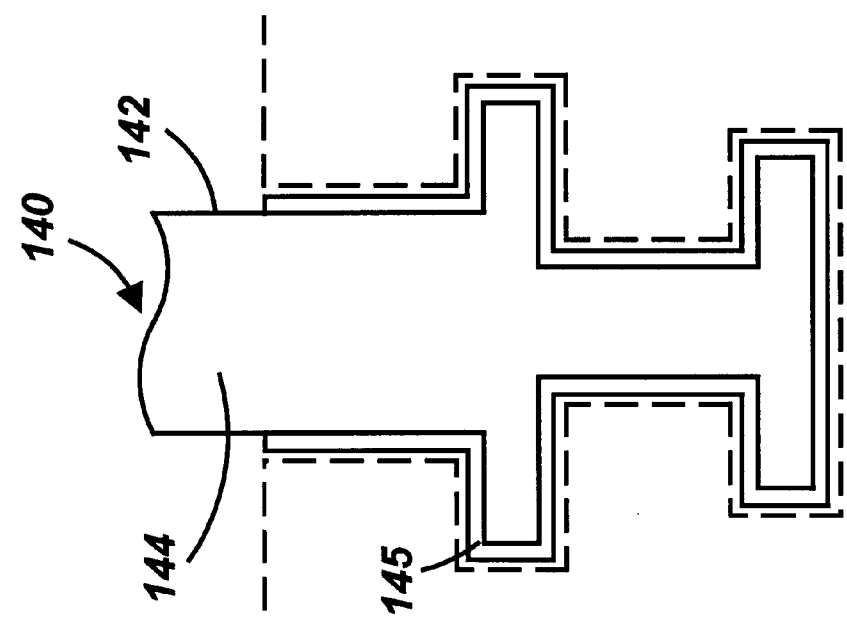
FIG. 18 is a side view of the blading system of FIG. 14, showing the root attachment covered with the damper according to the present invention.
Figure 17:
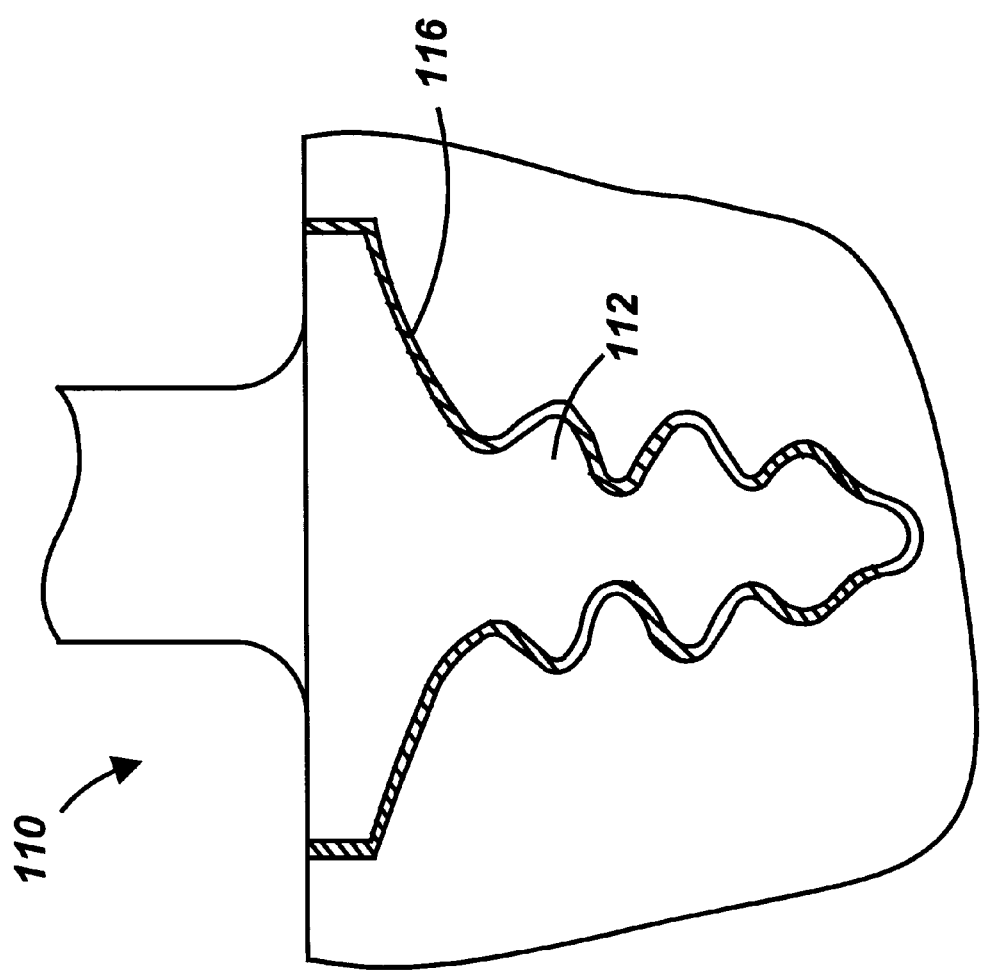
FIG. 17 is a side view of the blading system of FIG. 12, showing the damper selectively positioned on the root attachment according to the present invention.

Referring now to the static structure or isolation table 200 of FIGS. 15 and 16, it may be used to minimize the vibration of an object 202 such as a turbomachine or a high precision electronic component placed thereon, or to reduce the transmission of vibration from the environment to such object 202. The object 202 is shown in dashed lines in FIG. 16. The exemplary static structure 200 generally includes a foundation block 204, which retains a plurality of columns in an upright position. In this particular example, four columns 205, 206, 207, 208 are illustrated. It should however be understood that a different number of columns may be used. A flat, horizontal platform 210 is secured to the columns 205–208, for supporting the object 202. A plurality of pins 209 adjustably support the columns 205–208.

In this particular example, the columns 205–208 are identical, and therefore, only one column, i.e., 205 will be described in greater detail. The column 205 includes an upright, generally flat, and rectangularly shaped post 211, which extends into a root attachment 214. The root attachment 214 may have any of the shapes described herein. However, for illustration purpose, the root attachment 214 is shown as being dovetail shaped. A pair of dampers 215, 216 are externally secured to the dovetail surface of the root attachment 214, as described herein, for causing the structural vibration to be damped.

In operation, the dampers 215, 216 are compressed between the root attachment 214 and the foundation block 204, and provide an optimal damping path for the vibration energy. As vibration energy propagates through the foundation block 204, or from the horizontal platform 210, it is substantially damped by the dampers 215, 216 and dissipated as heat.

Another aspect of the static structure 200 is its ability to dissipate vibration energy along at least two axes X and Y. In the example shown in FIG. 15, each of the two opposite pairs of columns, such as the first pair (205, 207) and the second pair (206, 208) is oriented in such a way as to provide individual directional damping. The columns 205, 207 provide damping along the Y axis, since these columns tend to vibrate more readily along this axis as a result of their low moments of inertia about the X axis. For similar reasons, the columns 206, 208 provide damping along the X axis.

While FIGS. 15 and 16 illustrate the pairs of columns as being perpendicularly oriented along the X and Y axes, it should be understood that a different number of columns may be selected, such that these columns are angularly positioned relative to each other, for selectively and directionally optimizing the structural vibration damping. For instance, only three columns may be used and positioned at 60° relative to each other, for optimizing the damping along three different directions.

While specific embodiments of the present invention have been illustrated and described in accordance with the present invention, modifications and changes of the apparatus, parameters, and composition, use and operation will become apparent to those skilled in the art, without departing from the scope of the invention.

What is claimed is:

1. In a turbomachine including at least one stator disc having a plurality of radial stator vanes, and at least one rotor disc terminating in a plurality of radial hubs to retain a plurality of blading systems, each of the blading systems comprising in combination:

a blade formed of an airfoil and a root attachment;

said root attachment being dimensioned to fit within and to engage a corresponding one of the hubs, and including at least one outer surface on which a compressive and shear force develops upon rotation of said rotor disc; and at least one viscoelastic damper positioned against said outer surface of said root attachment, intermediate said root attachment and said corresponding one of the hubs, for compression therebetween upon rotation of said rotor disc to dampen vibration energy resulting from the passage of said blade in proximity to the stator vanes, without affecting the aerodynamic performance of the turbomachine.

2. The turbomachine according to claim 1, wherein the compression and shear of said viscoelastic damper provides a load path between the rotor disc and said root attachment, along which the vibration energy is damped due to deformation of said viscoelastic damper in compression.

3. The turbomachine according to claim 2, wherein said root attachment has a dovetail configuration, and includes two outer surfaces; and wherein two viscoelastic dampers are secured, one to each of said outer surfaces.

4. The turbomachine according to claim 3, wherein said dovetail root attachment includes two opposite flat shoulders;

wherein said shoulders extend into two inclined sides; and wherein said two viscoelastic dampers are secured, one to each of said inclined sides.

5. The turbomachine according to claim 4, wherein said two viscoelastic dampers are further secured on said shoulders.

6. The turbomachine according to claim 2, wherein said viscoelastic damper covers the entire root attachment.

7. The turbomachine according to claim 2, wherein said viscoelastic damper includes a rigid plate, and a viscoelastic member secured to said plate.

8. In a turbomachine including at least one stator disc having a plurality of radial stator vanes, and at least one rotor disc terminating in a plurality of radial hubs to retain a plurality of blading systems, each of the blading systems comprising in combination:

a blade formed of an airfoil and a root attachment;

said root attachment being dimensioned to fit within and to engage a corresponding one of the hubs, and including at least one outer surface on which a compressive force develops upon rotation of said rotor disc; and at least one viscoelastic damper positioned against said outer surface of said root attachment, intermediate said root attachment and said corresponding one of the hubs, for compression therebetween upon rotation of said rotor disc to dampen vibration energy resulting from the passage of said blade in proximity to the stator vanes, without affecting the aerodynamic performance of the turbomachine;

wherein the compression of said viscoelastic damper provides a load path between the rotor disc and said root attachment, along which the vibration energy is damped due to deformation of said viscoelastic damper in compression; and wherein said viscoelastic damper includes a thin shear layer of viscoelastic material.

9. The turbomachine according to claim 8, wherein said viscoelastic damper is made of polyurethane of high durometer.

10. The turbomachine according to claim 8, wherein said viscoelastic damper is formed of an adhesive tape.

11. The turbomachine according to claim 8, wherein said viscoelastic damper is selected from the group consisting essentially of: material generally characterized as rubber, adhesive, cellular urethane, adhesive transfer tape.

12. The turbomachine according to claim 8, wherein said blade is selected from the group consisting essentially of: metal and composite material.

13. The turbomachine according to claim 8, wherein said root attachment has a fir tree configuration.

14. The turbomachine according to claim 13, wherein said at least one outer surface includes a plurality of outer surfaces; and wherein said at least one viscoelastic damper includes a plurality of dampers that are selectively placed on predetermined ones of said plurality of outer surfaces between said adapter and said collar.

15. The turbomachine according to claim 13, wherein said viscoelastic damper covers said root attachment.

16. The turbomachine according to claim 8, wherein said blade further includes a collar; and wherein the blading system further includes an adapter that receives said collar for engagement to said corresponding one of the hub.

17. The turbomachine according to claim 16, wherein said adapter has a dovetail shape, and wherein said collar has a circular cross-section.

18. The turbomachine according to claim 8, wherein said root attachment is generally T-shaped.

19. The turbomachines according to claim 18, wherein said at least one outer surface includes a plurality of outer surfaces; and wherein said at least one viscoelastic damper includes a plurality of dampers that are selectively placed on predetermined ones of said plurality of outer surfaces.

20. A blading system for use in a turbomachine having at least one stator disc with at least one radial stator vane and at least one rotor disc terminating in at least one radial hub to retain the blading system, the blading system comprising in combination:

a blade formed of an airfoil and a root attachment;

said root attachment being dimensioned to fit within and to engage a corresponding one of the hubs, and including at least one outer surface on which a compressive force develops upon rotation of said rotor disc;

at least one viscoelastic damper positioned against said outer surface of said root attachment, intermediate said root attachment and a hub, for compression therebetween upon rotation of said rotor disc so as to dampen vibration energy;

wherein the compression of said viscoelastic damper provides a load path between the rotor disc and said root attachment along which the vibration energy is damped due to deformation of said viscoelastic damper in compression; and wherein said viscoelastic damper includes a thin shear layer of viscoelastic material.

21. A blading system for use in a turbomachine having at least one stator disc with at least one radial stator vane and at least one rotor disc terminating in at least one radial hub to retain the blading system, the blading system comprising in combination:

a blade formed of an airfoil and a root attachment;

said root attachment being dimensioned to fit within and to engage a hub, and including at least one outer surface on which a shear force develops upon rotation of said rotor disc;

at least one viscoelastic damper positioned against said outer surface of said root attachment, intermediate said root attachment and said corresponding one of the hubs, for shear therebetween upon rotation of said rotor disc so as to dampen vibration energy;

wherein the shear of said viscoelastic damper provides a load path between the rotor disc and said root attachment, along which the vibration energy is damped due to deformation of said viscoelastic damper in shear; and wherein said viscoelastic damper includes a thin shear layer of viscoelastic material.

\* \* \* \* \*